US012485935B2

(12) United States Patent
Meers

(10) Patent No.: US 12,485,935 B2
(45) Date of Patent: Dec. 2, 2025

(54) TREADPLATE FOR A FLOOR OF A GANGWAY AND GANGWAY

(71) Applicant: Dellner Couplers AB, Falun (SE)

(72) Inventor: Christopher Meers, Derby (GB)

(73) Assignee: Dellner Couplers AB, Falun (SE)

( * ) Notice: Subject to any disclaimer, the term of this patent is extended or adjusted under 35 U.S.C. 154(b) by 1056 days.

(21) Appl. No.: 17/509,736

(22) Filed: Oct. 25, 2021

(65) Prior Publication Data

US 2022/0135089 A1 May 5, 2022

(30) Foreign Application Priority Data

Oct. 29, 2020 (EP) .................................. 20204572
Nov. 12, 2020 (EP) .................................. 20207233

(51) Int. Cl.
| | | |
|---|---|---|
| B61D 17/22 | (2006.01) | |
| B60D 5/00 | (2006.01) | |
| B61D 5/00 | (2006.01) | |
| B61D 17/10 | (2006.01) | |
| B61D 17/20 | (2006.01) | |

(52) U.S. Cl.
CPC ............ *B61D 17/22* (2013.01); *B60D 5/003* (2013.01); *B60D 5/006* (2013.01); *B61D 5/00* (2013.01); *B61D 17/10* (2013.01); *B61D 17/20* (2013.01)

(58) Field of Classification Search
CPC .. B61D 17/10; B61D 17/20–22; B60D 5/003; B60D 5/006; B60D 5/00
USPC ....................................................... 105/8.1–25
See application file for complete search history.

(56) References Cited

U.S. PATENT DOCUMENTS

| | | | | | |
|---|---|---|---|---|---|
| 4,905,607 | A | * | 3/1990 | Wanneroy | B60D 5/006 |
| | | | | | 105/15 |
| 5,690,033 | A | * | 11/1997 | Andre | B61D 3/187 |
| | | | | | 105/458 |
| 2012/0234819 | A1 | * | 9/2012 | Berger | B61D 27/0045 |
| | | | | | 219/213 |
| 2015/0367863 | A1 | * | 12/2015 | Hirashima | B61D 17/08 |
| | | | | | 105/422 |
| 2017/0028998 | A1 | * | 2/2017 | Davis | B61D 17/10 |

FOREIGN PATENT DOCUMENTS

| | | | | |
|---|---|---|---|---|
| AT | 10938 U1 | * | 1/2010 | |
| CN | 104254471 A | * | 12/2014 | ............. B61D 17/20 |
| CN | 208198412 U | | 12/2018 | |
| DE | 102015214747 A1 | * | 2/2017 | |
| EP | 0297936 A1 | | 1/1989 | |
| EP | 0701936 A1 | | 3/1996 | |
| EP | 0860305 A1 | | 8/1998 | |
| EP | 0939017 A2 | | 9/1999 | |
| EP | 2669134 A1 | | 12/2013 | |
| EP | 2998135 A1 | * | 3/2016 | ............. B60D 5/003 |
| FR | 2865984 A1 | * | 8/2005 | ............. B60D 5/00 |
| WO | 02070320 A1 | | 9/2002 | |

* cited by examiner

*Primary Examiner* — S. Joseph Morano
*Assistant Examiner* — James William Jones
(74) *Attorney, Agent, or Firm* — Howard IP Law Group, PC

(57) ABSTRACT

A treadplate for a floor of a gangway the treadplate having a basic body of a first material, and a plurality of bones of a second material, wherein the bones are encapsulated by the first material, wherein the second material has a higher elastic modulus than the first material and/or the stiffness of at least one bone of the several bones is higher than the stiffness of the basic body.

21 Claims, 12 Drawing Sheets

TREADPLATE FOR A FLOOR OF A GANGWAY AND GANGWAY

FIELD OF INVENTION

The invention relates to a treadplate for a floor of a gangway. The invention also relates to a gangway itself. The invention also relates to a method for producing a treadplate of a gangway.

BACKGROUND

From EP 0 669 243 A1 a diagonal movable bridge element for a gangway between two vehicles is known.

SUMMARY

Given this background, the problem to be solved by the invention is to suggest a treadplate that can follow movements of the parts that it is in contact with more closely and/or to provide a stiffer floor.

This problem is solved by the treadplate, gangway, and method according to embodiments of the present disclosure.

According to the invention, the treadplate for a floor of a gangway has a basic body of a first material and several bones of a second material, whereby the bones are encapsulated by the first material, whereby the second material has a higher elastic modulus than the first material and/or the stiffness of at least one bone of the several bones is higher than the stiffness of the basic body.

A treadplate for a gangway is understood to be one of the elements that makes up a gangway floor. In a specific field of use, the treadplate is the element that bridges from a vehicle mounting plate of the gangway to a further element of the gangway floor. A treadplate often is fixed as regards its placement in space on one of its side by way of this one side being connected to the vehicle mounting plate of the gangway. The placement of the individual segments of the treadplate in space will hence typically be fixed by one side of the treadplate being connected to a vehicle mounting plate of the gangway. This one side of the treadplate in the embodiments, where this side is connected to a vehicle mounting plate, will hence keep the shape and placement that is given to it by way of it being connected to the vehicle mounting plate. Typically, this one side of the treadplate being connected to a straight line beam of the vehicle mounting plate will hence stay in a straight line and will follow the movements of this beam of the vehicle mounting plate in space. Hence if the car of a train to which the vehicle mounting plate is connected tilts, this one end of the treadplate will follow this tilting movement.

The treadplate according to the invention has a basic body of a first material. The basic body predominantly defines the general shape of the treadplate. The basic body has a rim that runs around the basic body. This rim can have a multitude of shapes, the shape being defined by the intended use of the treadplate. The rim can define a rectangle, giving the basic body a rectangular shape. The rim can define a polygon, giving the basic body a polygonal shape. The rim can also have the shape of a trapezium, giving the basic body the shape of a trapezium. The rim can also have the shape of the rim of half a moon (the half of a cycle), giving the basic body the shape of half a moon. A multitude of other shapes of the rim are feasible within the concept of the invention.

In a preferred embodiment, the rim that surrounds the basic body has a linear section, in which linear section the rim of the basic body extends along a line. This linear section of the rim of the basic body can for example be used to connect the treadplate to a vehicle mounting plate of a gangway. The rim can have further linear sections, for example if the rim has the shape of a rectangle.

The treadplate according to the invention has several bones of a second material, whereby the bones are encapsulated by the first material. Designs are feasible that fall under the invention, where a part of an individual bone of the several bones is not covered by the first material and hence makes up a free surface of the treadplate. For example, an end face of one of the bones of the several bones can be a free surface that is not covered by the first material. Designs are also feasible, where a partial surface of the bone along the longitudinal extent of the bone is not covered by the first material. In a preferred embodiment, the sum of the area of the surface sections of a bone that is not covered by the first material is smaller, preferably smaller by a factor of 2, more preferably smaller by a factor of 5, preferably smaller by a factor of 10 than the sum of the area of the surface sections of the individual bone that is covered by the first material. It is most preferred, if the individual bone of the several bones is fully encapsulated by the first material and no surface sections of the individual bone is not covered by the first material.

According to the invention, the second material is stiffer than the first material. A material is considered to be stiffer than another material according to the concept of the invention, if the elastic modulus of the one (stiffer) material is larger than the elastic modulus of the other (less stiffer) material. Within the invention, the second material is considered to be stiffer than the first material, if the Young's modulus of the second material is larger than the first material. In a preferred embodiment, the Young's modulus of the second material is larger than the Young's modulus of the first material by a factor of more than 10, more preferably of more than 50, more preferably of more than 100, more preferably of more than 500. If the first material is, for example, rubber, the Young's modulus is about 0.01 to 0.1 GPA. If the second material is aluminium, the Young's modulus is about 70 GPA. The Young's modulus of the second material (aluminium in this example) would hence be larger by a factor of more than 700 than the Young's modulus of the first material (rubber in this example).

In addition or as an alternative, the concept of the invention to make the second material stiffer than the first material can be obtained by the choosing the physical dimensions of the object made from the first material (the basic body) in certain relation to the physical dimensions of the object made from the second material, namely the bones. In a preferred embodiment, the stiffness, k, of the object made up from the first material as a measure of resistance offered by the body to deformation and represented in newtons per metre is smaller than the stiffness k of the object that is made up from the second material, namely the individual bone of the several bones provided as part of the treadplate according to the invention. The stiffness, k, of the body made up from the first material is considered to be the resistance offered by this body against deformation, if the bones are not inside this body, e.g. if within the body instead of the bones a cavity filled with air is present.

The treadplate according to the invention combines the advantageous flexibility of the first material that helps the treadplate follow other elements, to which it is connected or on which it rests, with the stiffness provided by the bones by way of encapsulating the bones with the first material. The additional advantage is provided that the treadplate can be handled as one piece and/or has a homogeneous outer appearance and/or prevents decay of the bones, if the material used for the bones could be subject to decay if made to come into contact with air and/or water.

The treadplate according to the invention also has the advantage that it can be adapted in its design with little effort. If according to a preferred embodiment the basic body is created by moulding it over the several bones, while at the same time encapsulating the bones with the first material, the shape of the treadplate can be easily adapted by adapting the mold. The stiffness of the treadplate according to the invention can easily be adapted by choosing appropriate dimensions and material for the bones and appropriate dimensions and material for the basic body. Making the bones larger will increase the stiffness, making the bones slimmer will reduce the stiffness of the treadplate.

In a preferred embodiment, the majority of bones, more preferably all bones are elongated elements. An elongated element is considered to be an element that has a first direction, into which it has a first extent, which will be referred to as the lengthwise extent, and has an extent in a second direction that is perpendicular to the first direction, which extent into this second direction will be referred to as the widthwise extent, and has an extent into a third direction, which third direction is perpendicular to the first direction and perpendicular to the second direction, whereby the extent of the element into this third direction will be referred to as the heightwise direction. An elongated element is considered to be an element, where the lengthwise direction is larger than the heightwise direction and larger than the widthwise direction. In a preferred embodiment, the lengthwise direction is larger than the widthwise direction by a factor of 2, more preferably by a factor of 3, preferably by a factor of 5, more preferably by a factor of 10. In a preferred embodiment, the lengthwise direction is larger than the heightwise direction by a factor of 2, more preferably by a factor of 3, preferably by a factor of 5, more preferably by a factor of 10. In a preferred embodiment, the widthwise direction is larger than the heightwise direction by a factor of 2, more preferably by a factor of 3, preferably by a factor of 5, more preferably by a factor of 10.

In a preferred embodiment the majority of bones, more preferably all bones have a rectangular, more preferably a quadratic cross section or have a trapezoidal or a polygonal cross section. The bones in an alternative embodiment can have a round or an elliptical cross section. The shape of the cross section is most preferably determined as a cross section perpendicular to the lengthwise direction of the individual bone.

In a preferred embodiment the thickness of at least one of the bones, preferably the thickness of the majority of bones, most preferably the thickness of all of the several bones is in the range of 1 mm to 20 mm, more preferably in the range of 2 mm to 15 mm, more preferably in the range of 3 mm to 10 mm.

In a preferred embodiment the width of at least one of the bones, preferably the thickness of the majority of bones, most preferably the thickness of all of the several bones is in the range of 5 mm to 150 mm, more preferably in the range of 15 mm to 125 mm, more preferably in the range of 20 mm to 100 mm.

In a preferred embodiment, a plurality of the bones of the treadplate, more preferably the majority of the bones of the treadplate and in a most preferred embodiment all bones of the treadplate are arranged parallel to each other.

In a preferred embodiment, the treadplate has a first end, whereby the majority of bones, preferably all bones have an end surface close to the first end, whereby these end surfaces are arranged in one plane or are arranged in planes that are parallel to each other. In a more preferred embodiment, the distance of the end surface of the majority of bones, preferably of all bones of the treadplate to the first end of the treadplate is the same.

In a preferred embodiment, the first end of the treadplate is a section of the rim, which section of the rim is a linear section (extends along a straight line). In a preferred embodiment, the first end of the treadplate is intended to be connected to a vehicle mounting plate or a frame of a gangway.

In a preferred embodiment, the treadplate has a second end, whereby a plurality, more preferably a majority of bones, preferably all bones have an end surface close to the second end, whereby these end surfaces are arranged in one plane or are arranged in planes that are parallel to each other.

In a preferred embodiment, the majority of bones, more preferably all bones are made of the same material. In a preferred embodiment, the majority of bones, more preferably all bones are made of metal, more preferably of steel or aluminium. The bones could also be made from composite materials or made of plastic, more preferably of nylon.

In a preferred embodiment the basic body is made of rubber, more preferably of VAMAC (ethylene acrylic elastomer) or a different elastomer type, for example EPDM (ethylene propylene diene monomer rubber) or SBR (styrene-butadiene rubber), or Silicone.

In a preferred embodiment, the basic body has a width direction and has a maximum width in the width direction, whereby the bones of the treadplate extend along a longitudinal axis that is not directed into the width direction and not directed parallel to the width direction, and whereby the width of a bone in the width direction is at least 0.5%, more preferably at least 1%, more preferably at least 2% of the maximum width of the basic body. In a possible embodiment of the invention, the width of a bone could for example be 20 mm, while the maximum width of the treadplate could be 600 mm. Designs are also feasible, where a bone could have a width of about 20 mm and the treadplate could have a maximum width of about 1200 mm.

In a preferred embodiment, the longitudinal axis of the bone, which is also the axis that points into the lengthwise direction of the bone, if the bone is made as an elongated element, extends perpendicular to the width direction of the basic body.

In a preferred embodiment the part of the basic body that has the maximum width of the basic body is closer to the first end than to a second end of the treadplate that is opposite the first end. In a preferred embodiment, the maximum width of the treadplate is at the first end.

In a preferred embodiment, the basic body has a width direction and has a maximum width in the width direction, whereby the bones extend along a longitudinal axis that is not directed into the width direction and not directed parallel to the width direction and most preferably is directed perpendicular to the width direction, whereby the width of a bone in the width direction is larger than the gap between this bone and a neighbouring bone. In a preferred embodiment, for the majority of bones, more preferably for all bones the width of a bone in the widthwise direction is larger than the gap between this bone and a neighbouring bone.

In a preferred embodiment the sum of the extends that the bones have in the width direction at the part of the first body, where the basic body is, makes up of at least 50%, more preferably of at least 60% and even more preferably of at least 70% of the maximum width of the basic body.

In a preferred embodiment, the treadplate has a fabric layer. In a preferred embodiment, the first material, which is the material of the basic body, is a composite material. The first material can have a first component, which can be rubber, which first component is arranged around the bones and encapsulates the bones. A first layer of fabric can be arranged on the top and/or the bottom surface of this first rubber layer. A further rubber layer can be arranged on top or below the fabric layer.

The gangway according to the invention has a floor, whereby the floor has a treadplate according to the invention.

In a preferred embodiment, the gangway according to the invention has an two-entry openings for people to enter the gangway at opposite ends of the gangway, whereby the majority of bones, more preferably all bones are elongated elements that that have their lengthwise extent in the direction that points from one end of the gangway to the opposite end of the gangway.

In a preferred embodiment the floor has a first treadplate and a second treadplate, whereby at least the first treadplate is according to the invention, and whereby the first treadplate rests on the second treadplate or the second treadplate rests on the first treadplate.

In a preferred embodiment, the gangway according to the invention has a frame or a vehicle mounting plate. In a preferred embodiment, the treadplate is connected to the frame or the vehicle mounting plate with its first end.

The invention is also directed to a multi-car vehicle, which vehicle has a first car and a neighbouring second car, whereby the gangway is arranged between the first car and the second car.

The method according to the invention for producing a treadplate according to the invention provides the step of providing several bones and the step of vulcanizing the basic body onto the several bones.

The method may contain the steps of
providing a sheet of material that can be vulcanized as lower sheet
placing the several bones on this sheet of material
placing a further sheet of material that can be vulcanized upper sheet on top of the lower sheet and the several bones and
vulcanizing the sheets of material to the several bones.

The step of providing a sheet of material that can be vulcanized as lower sheet may contain the step of laying further layers of material below said sheet of material.

The step of providing a sheet of material that can be vulcanized as upper sheet may contain the step of laying further layers of material above said sheet of material.

The term "vulcanizing" or "vulcanized" are understood to contain the methods of moulding, open curing, autoclave curing.

BRIEF DESCRIPTION OF THE DRAWINGS

The invention will be described with reference to the figures that show embodiments of the invention below. The figures show.

DETAILED DESCRIPTION

Figure 1:
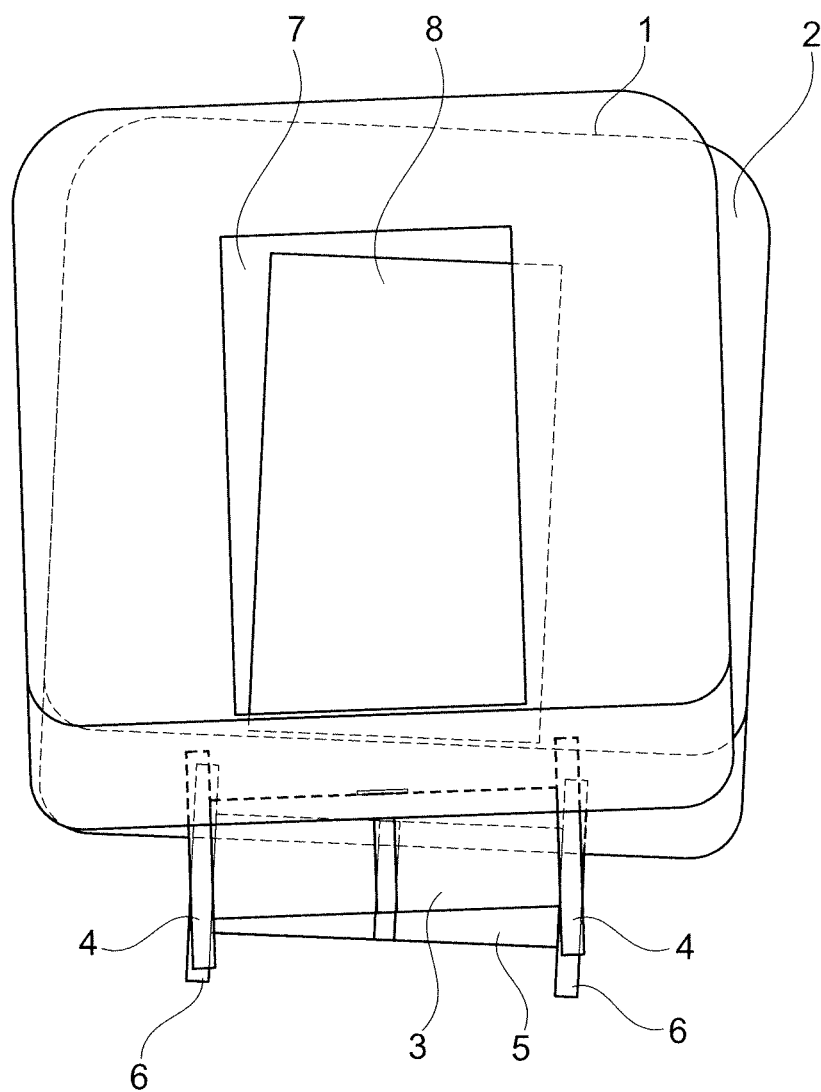
FIG. 1 a schematic front view onto a first car and a second car of a multicar vehicle, to which the gangway according to the invention can be applied that shows the roll angle.

FIG. 1 shows a first car 1 and a second car 2 of a multicar vehicle. Shown in FIG. 1 is axis 3 with wheels 4 of the first car and an axis 5 with wheels 6 of the second car 2. A gangway (not shown especially) is arranged between the first car 1 and the second car 2. The gangway has a first entry opening 7 at the first and a second entry opening 8 at the second car 2. FIG. 1 highlights that driving conditions are possible, where the first car 1 has rolled relative to the second car 2 to come into the position shown in FIG. 1. In the normal driving condition, where the multicar vehicle would be driven along a straight line on level ground, the first car 1 and the second car 2 would be in perfect alignment. The role about the role angle can result from super elevation or cant deficiency or can be imposed by wind dynamics or can result from poor tracks or can result from loading and suspension differences between the first car 1 and the second car 2 or can be combined with vertical displacements to give a stable cyclic movement of one car and relative to the other car end.

The gangways 100 shown in FIG. 2, 3, 4, 5 have at least one bellows 101 made up of several convolutes 102. In the embodiments shown in FIGS. 2, 3 and 5, the gangway 100 is made up of two gangway-halves 103 that are connected to each other in a center 104 of the gangway 100. Each gangway half 103 has a center-frame 104 that is connected to the center-frame 104 of the other gangway half 103. In the embodiments shown in FIGS. 2, 3 and 5 the gangway-halves 103 each have a vehicle mounting plate 105 arranged at the respective opposite end of the respective center-frame 104. The vehicle mounting plates 105 are used to connect the gangway 100 to a car.

Figure 4:
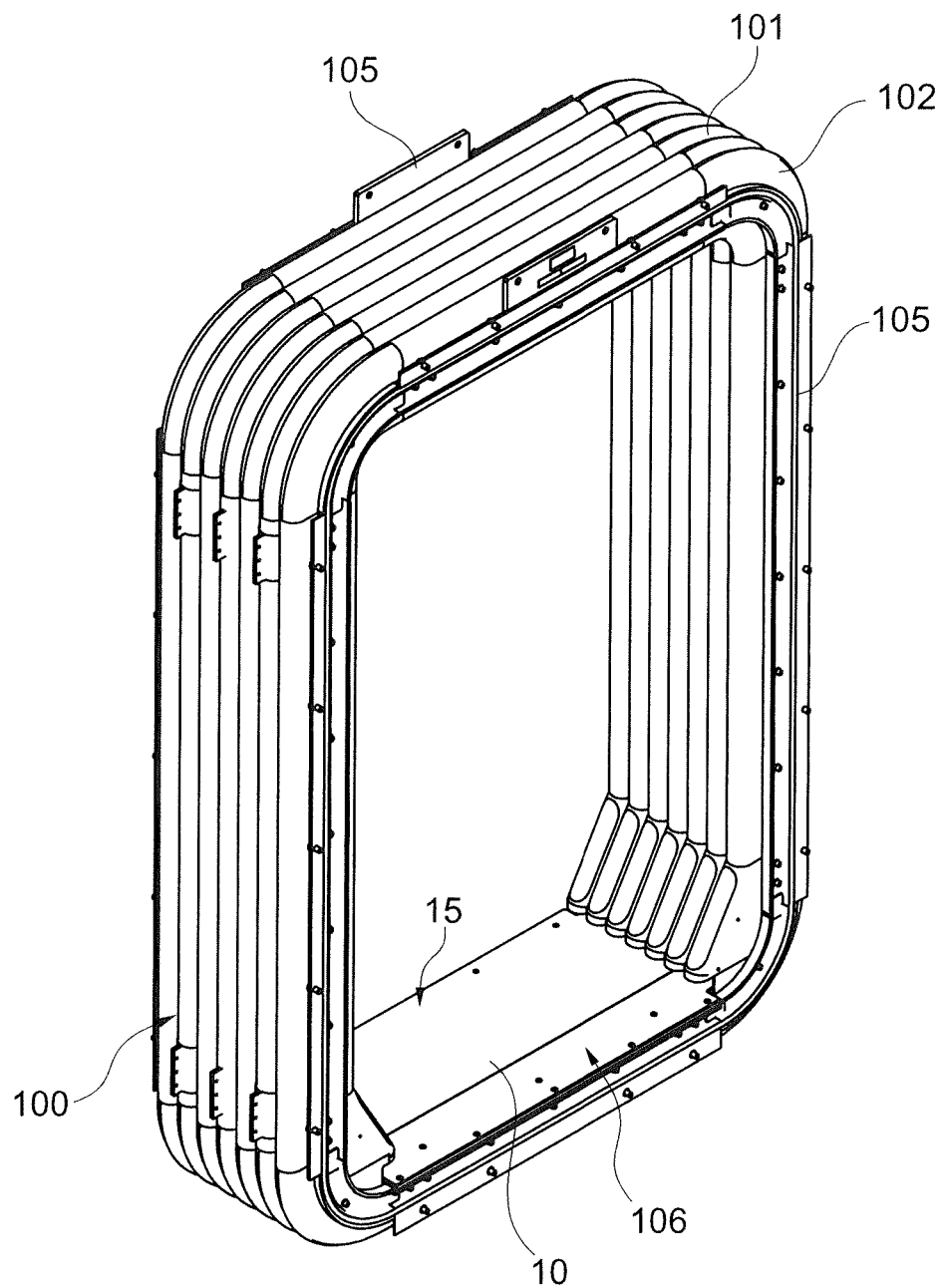
FIG. 4 a schematic, perspective view onto a gangway according to the invention according to a first embodiment.

In the embodiment shown in FIG. 4, the gangway 100 has two vehicle mounting plates 105.

Figure 2:
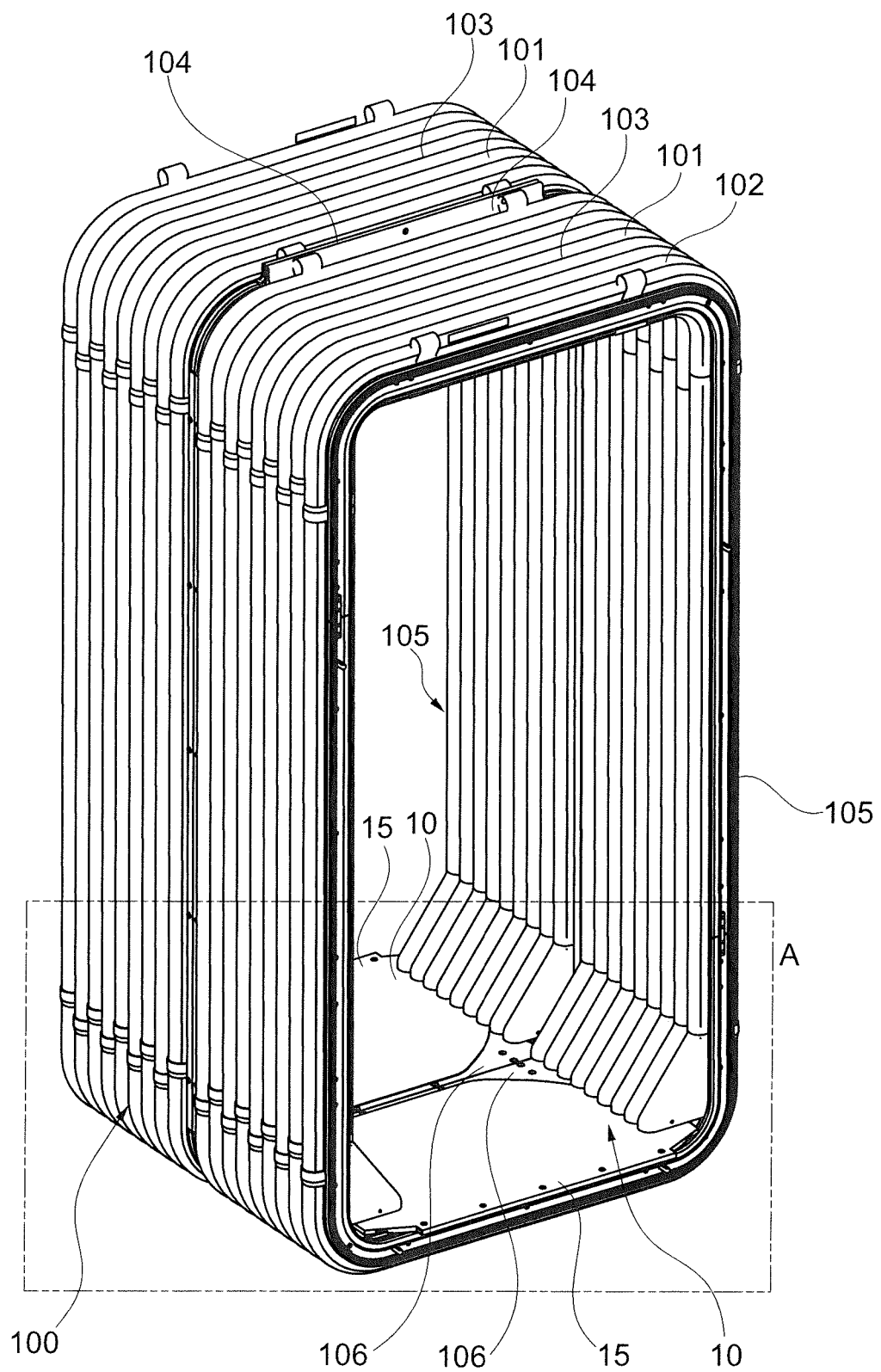
FIG. 2 a schematic, perspective view onto a gangway according to the invention according to a first embodiment.
Figure 3:
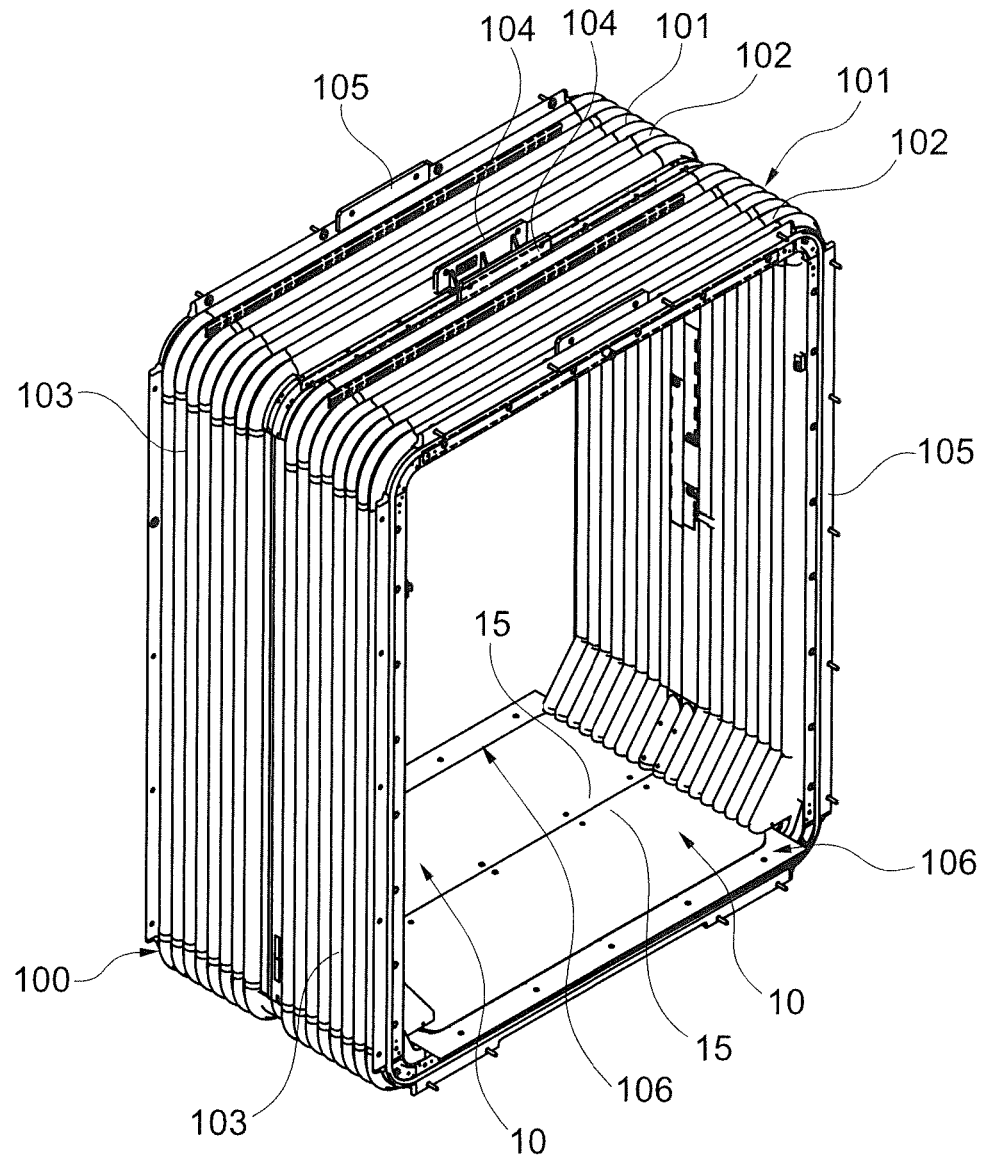
FIG. 3 a schematic, perspective view onto a gangway according to the invention according to a first embodiment.
Figure 5:
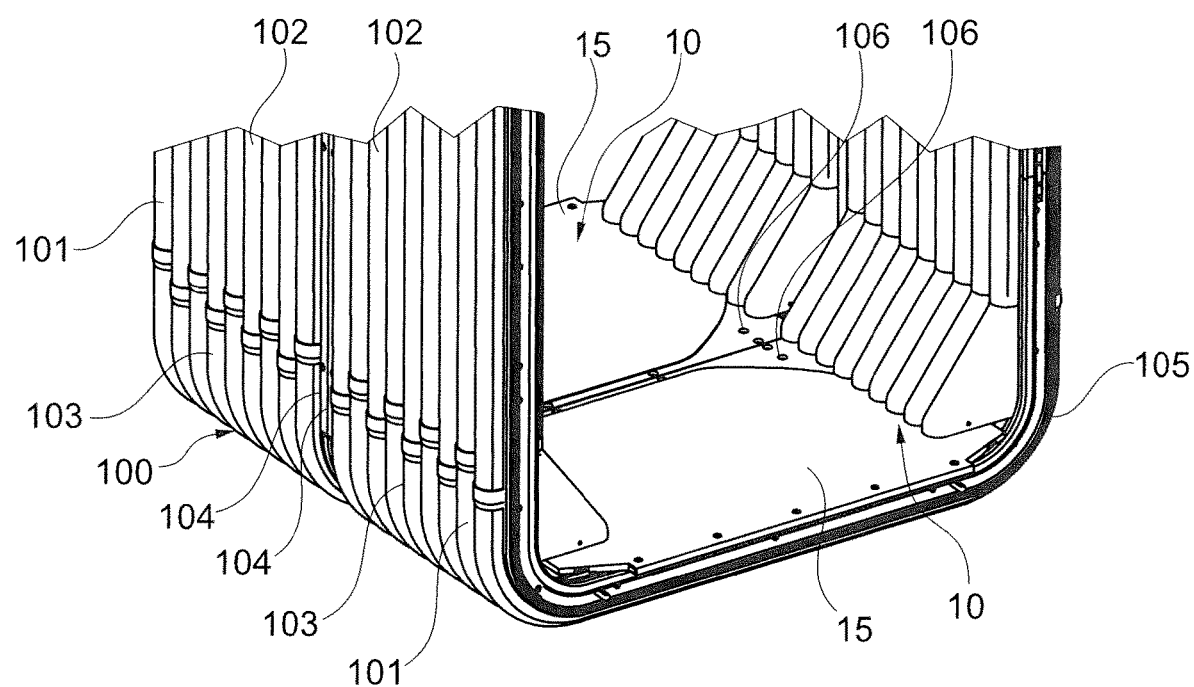
FIG. 5 a schematic, perspective view onto the detail A of FIG. 2.

One treadplate 10 or—depending on the embodiment— two treadplates 10 according to the invention are arranged in the gangways in the embodiments of FIGS. 2 to 5. The respective treadplate has a connection bar 15. The connection bar 15 in the embodiments of FIGS. 2, 4 and 5 is connected to a vehicle mounting plate 105. The connection bar 15 in the embodiment of FIG. 3 is connected to the center-frame 104.

The gangways 100 each have at least one further treadplate 106, which might be a treadplate according to the invention, but preferably is a different treadplate, preferably a stiff treadplate that is made from metal. The treadplate 10 according to the invention rests on the treadplate 106 and is supported by the treadplate 106.

The treadplate 10 according to the invention is suitable to be used as part of a floor of a gangway according to the invention. The treadplate 10 has a basic body 11. The basic body is made of a first material, which in the embodiment shown here is a composite material (see FIG. 7). In the embodiment shown in FIG. 6 the treadplate 10 has ten bones 12. The bones 12 are encapsulated by the first material. All surfaces of the bones 12 are covered with the first material.

The bones 12 are made of a second material.

Figure 6:
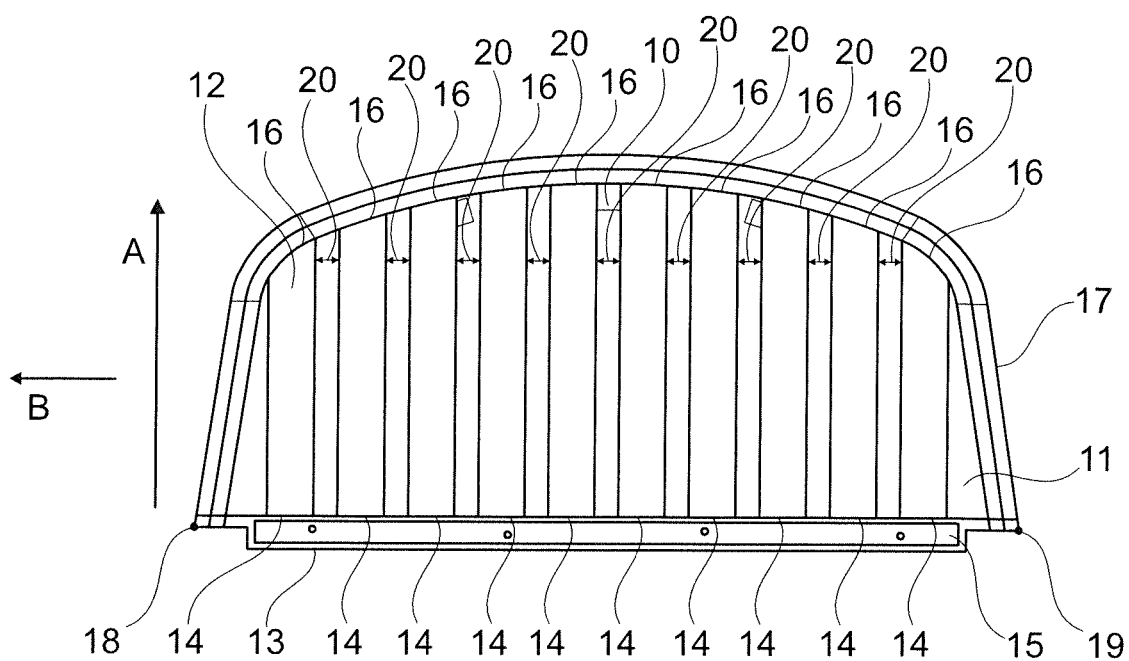
FIG. 6 shows a schematic top view onto a treadplate according to the invention.

FIG. 6 shows that all bones used in the treadplate 10 in this embodiment are elongated elements, which have their lengthwise direction extent parallel to the arrow A in FIG. 6. The widthwise direction of the bones in FIG. 6 is the direction of the arrow B. The heightwise direction of the bones is the direction perpendicular to the arrow A and perpendicular to the arrow B and hence the direction out of or into the paper of FIG. 6. The heightwise direction of the bones is also indicated by the arrow C in FIG. 7.

The embodiment shown in FIG. 6 shows an embodiment, where all bones of the treadplate are arranged parallel to each other.

The treadplate in the embodiment shown in FIG. 6 has a first end 13. The first end extends along a straight line parallel to the direction B. In the embodiment shown in FIG. 6, all bones 12 have end surfaces 14, which are arranged close to the first end 13 and in the embodiment shown in FIG. 6 are arranged at the same distance to the first end 13. The end surfaces 14 of the bones 12 are arranged in one plane in the embodiment in FIG. 6. This one plane is arranged perpendicular to the direction A.

The first end 13 has a connection bar 15 that can be used to fix the treadplate 10 to the frame or a vehicle mounting plate of a gangway.

The embodiment shown in FIG. 6 shows that the end surfaces 16 of the individual bones 12 that are arranged opposite to the end surfaces of 14 of the bones 12 that are arranged close to the first end 13 are not arranged in one plane and are not arranged in planes that are parallel to each other. The shape of the end surface 16 of the bones on the end of the treadplate opposite the first end 13 has been chosen and adapted to the general shape of the treadplate 10.

The embodiment shown in FIG. 6, 9, 10, 11 shows the basic body 11 to have a rim 17 that runs around the basic body. The embodiment shown in FIG. 6, 10 shows the treadplate to generally have the shape of a trapezium.

FIG. 6 shows the basic body 11 to have a width direction, which is in the direction of or parallel to the arrow B. The basic body 11 has a maximum width in the widthwise direction. The maximum width is the distance between the point 18 and 19 in FIG. 6. As can be seen, the embodiment shown in FIG. 6 has its maximum width closer to the first end 13 than to the end of the treadplate opposite the first end 13. As can be seen from FIG. 6, the bones 12 extend along a longitudinal axis, which is the axis parallel to the arrow A, which is not directed into the width direction of the basic body and not directed parallel to the width direction of the basic body, but directed perpendicular to it. The width of the individual bones 12 in the width direction of the basic body 11 is at least 1% of the maximum width of the basic body 11. In the purely schematic drawing of FIG. 6 the width of the individual bone 12 is about 6% of the maximum width of the basic body.

As can also be seen from FIG. 6, the width of all of the individual bone in the width direction of the basic body 11 is larger than the gap 20 between the respective bone 12 and its neighbouring bone 12.

Figure 7:
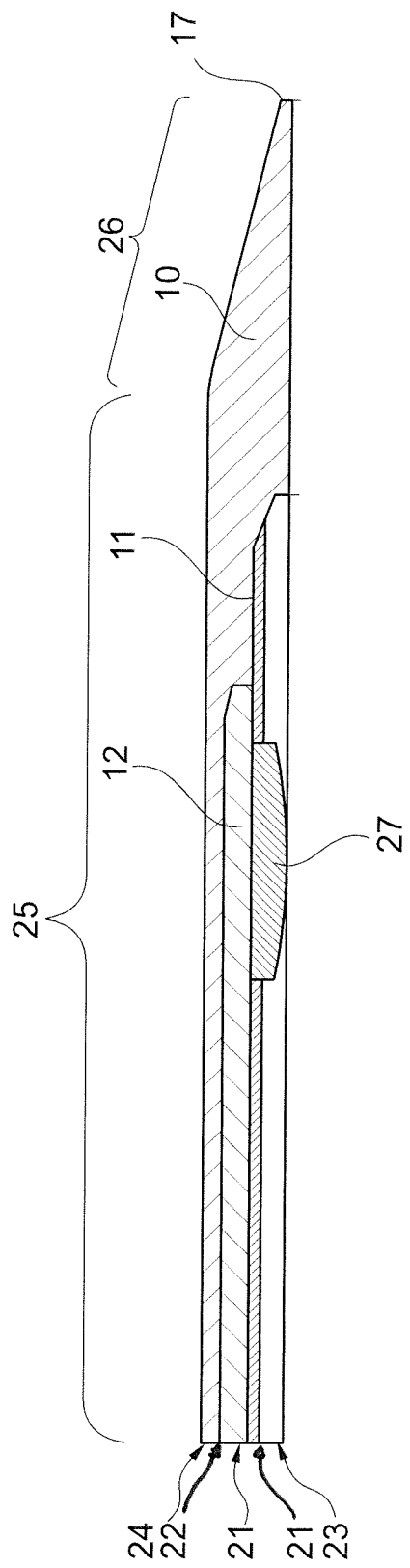
FIG. 7 a partial cross section through a treadplate according to the invention.

As seen in FIG. 7, 12 the first material is a composite material that consists of several layers. The first material has a first layer 21 that is a thin rubber layer that encapsulates the bones 12 and covers the space between the bones 12. Arranged on the top of the first layer is a second layer 22, which is a fabric layer. Arranged below the first layer 21 is a third layer 23, which is a fabric layer. Arranged on top of the second layer 22 is a further, fourth layer 24, which is a thick rubber layer.

As can be seen in FIG. 7, 11, the treadplate 10 in the area where the bones 12 are arranged, which can be considered to be the core area 25 of the treadplate, the basic body has a constant thickness. Between the core area 25 and the rim 17 is arranged a rim area 26. In the rim area 26, the width of the basic body 11 changes.

As can be seen from FIG. 7 10, 11, 12, the treadplate 10 according to the invention also can have wear pads 27 arranged at the underside of the treadplate 10.

Figure 8:
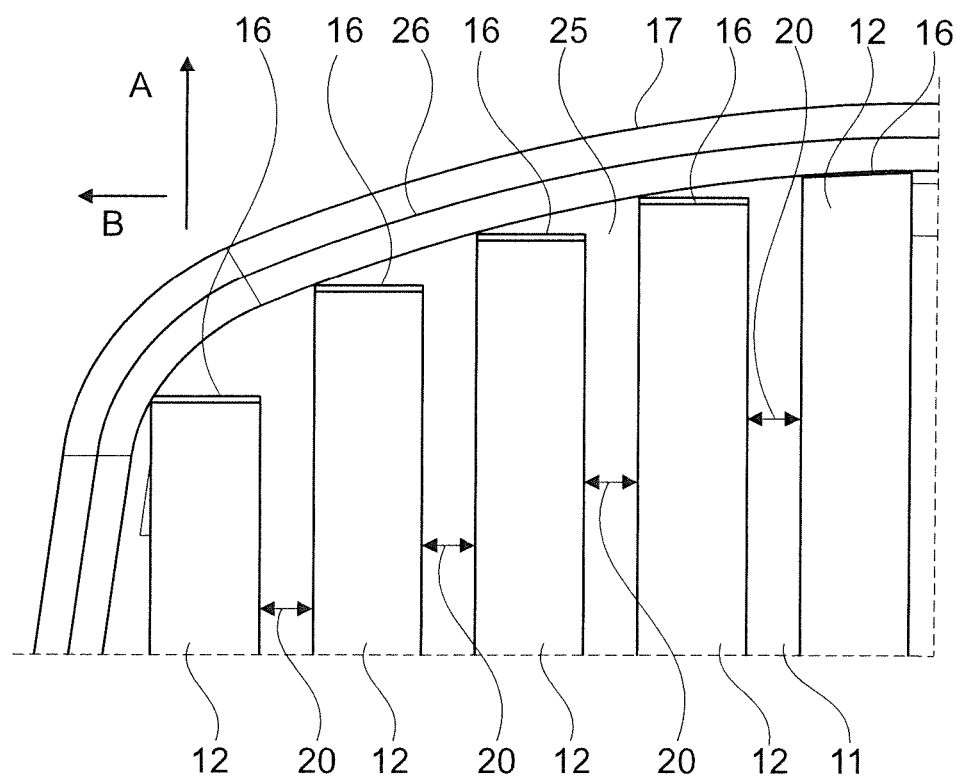
FIG. 8 a schematic top view of a part of the treadplate according to the invention.
Figure 9:
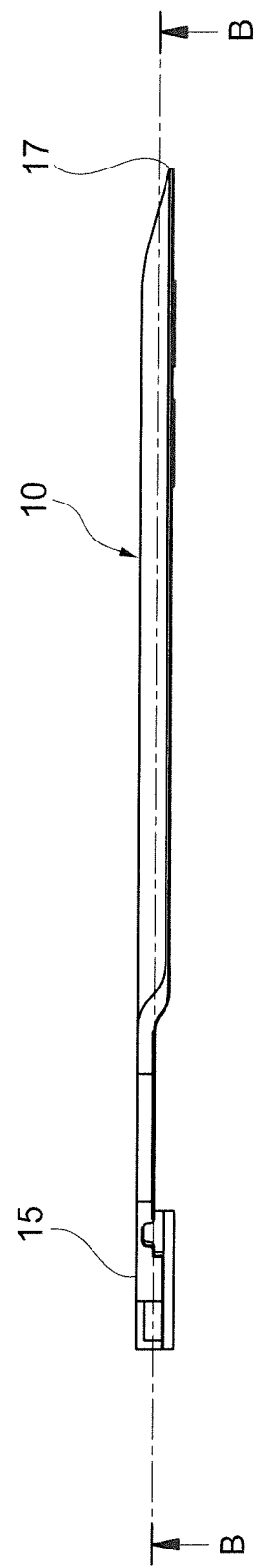
FIG. 9 a side view onto a treadplate according to the invention.
Figure 10:
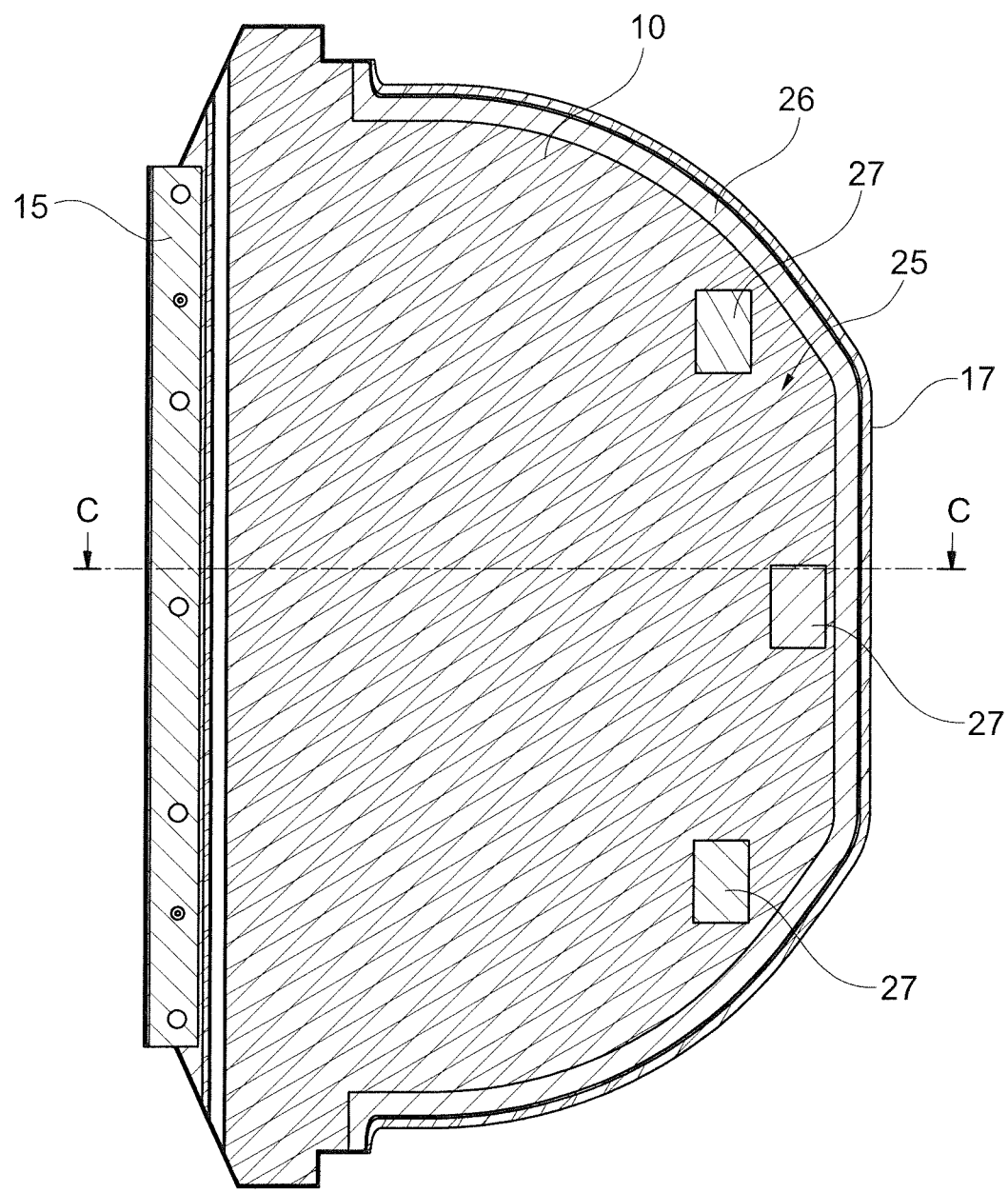
FIG. 10 a sectional view of the treadplate of FIG. 9 along the line B-B in FIG. 9.
Figure 11:
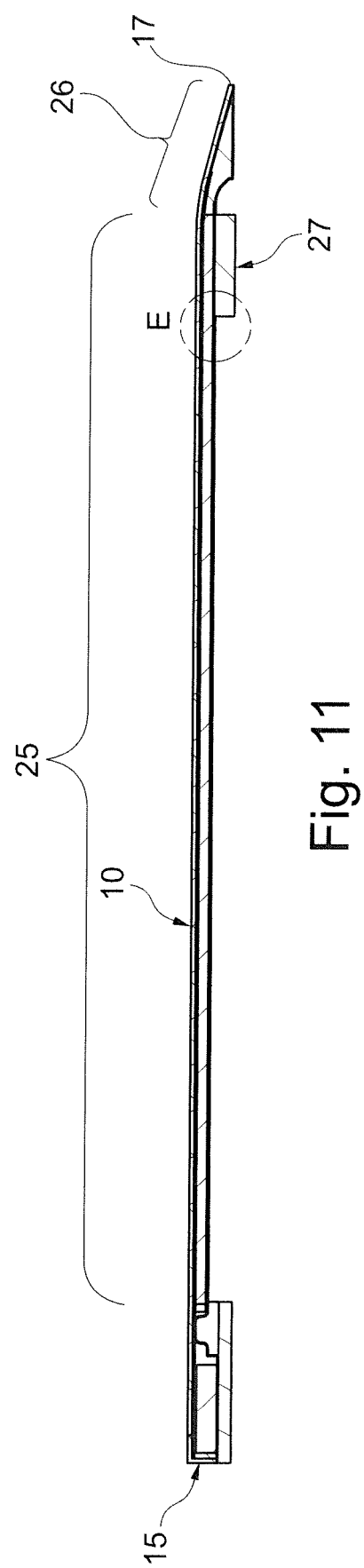
FIG. 11 a sectional view of the treadplate of FIG. 9 along the line C-C in FIG. 10 and FIG. 12 the detail E of FIG. 11.
Figure 12:
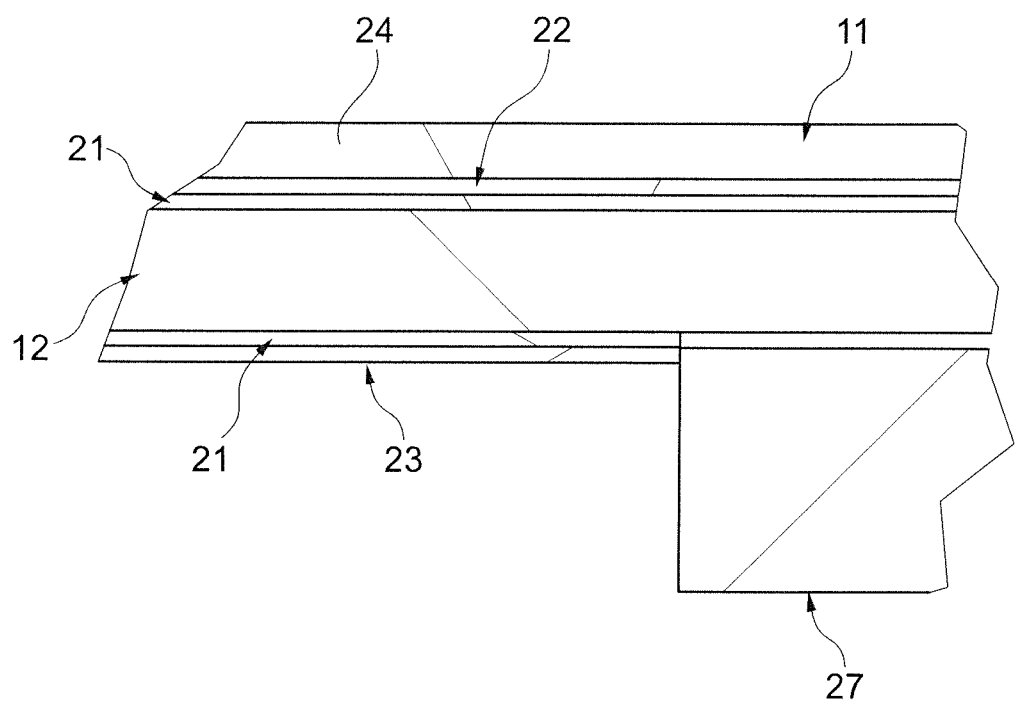

When compared to FIG. 6, which shows an embodiment, where the end surfaces 16 of the bones 12 are not arranged in one plane or in planes parallel to each other, FIG. 8 shows an alternative design of the end surfaces 16 of some of the bones 12 of the treadplate. As can be seen from FIG. 8, four bones 12 (the four bones 12 arranged to the left of the rightmost bone 12) have end surfaces 16 that each are arranged in planes that are parallel to each other and perpendicular to the longitudinal direction A . Such a design can be used to reduce the costs of producing a treadplate 10 according to the invention. The bones can be produced by simply cutting them off from a longitudinal bar without the need to provide the bones with champers or folds.

The invention claimed is:

1. A treadplate for a floor of a gangway, comprising:
a basic body of a first material;
a plurality of bones of a second material,
wherein the plurality of bones are encapsulated by the first material, and
wherein the second material has a higher elastic modulus than the first material, and/or a stiffness of at least one bone of the plurality of bones is higher than the stiffness of the basic body;
wherein a gap exists between each one of the bones and a nearest neighboring bone, and a width of a bone in a width direction is larger than the gap, wherein the gap extends along an entire length of each one of the bones and the nearest neighboring bone.

2. The treadplate according to claim 1, wherein a majority of the plurality of bones are elongated elements.

3. The treadplate according to claim 1, wherein a majority of the plurality of bones are arranged parallel to each other.

4. The treadplate according to claim 1, wherein the treadplate has a first end, and wherein a majority of the plurality of bones have end surfaces proximal to the first end, said end surfaces arranged in one plane or in planes that are arranged in parallel to each other.

5. The treadplate according to claim 1, wherein
the plurality of bones are made of metal or of plastic; and/or
the basic body is made of rubber.

6. The treadplate according to claim 1, wherein
a. the basic body has a width direction (B) and a maximum width in the width direction (B);
b. the plurality of bones extend along a longitudinal axis (A) that is not directed into the width direction (B) and not directed parallel to the width direction (B);
c. the width of a bone in the width direction (B) is at least 0.5% of the maximum width of the basic body.

7. The treadplate according to claim 1, wherein:
   a. the basic body has a width direction (B) and a maximum width in the width direction (B);
   b. the plurality of bones extend along a longitudinal axis (A) that is not directed into the width direction (B) and not directed parallel to the width direction (B).

8. The treadplate according to claim 1, further comprising a fabric layer.

9. The treadplate according to claim 1, wherein the second material has a higher elastic modulus than the first material.

10. The treadplate according to claim 1, wherein the stiffness of at least one bone of the plurality of bones is higher than the stiffness of the basic body.

11. The treadplate of claim 1, wherein the gangway comprises entry openings for entry into the gangway at opposite ends of the gangway, and
   wherein a majority of said plurality of bones are elongated elements that extend in the direction that points from one end of the gangway to the opposite end of the gangway.

12. A gangway comprising a floor, the floor having a treadplate comprising a basic body of a first material; a plurality of bones of a second material, wherein the plurality of bones are encapsulated by the first material, and wherein a) the second material has a higher elastic modulus than the first material, and/or b) a stiffness of at least one bone of the plurality of bones is higher than the stiffness of the basic body;
   wherein a gap exists between each one of the bones and a nearest neighboring bone, and a width of a bone in a width direction is larger than the gap, wherein the gap extends along an entire length of each one of the bones and the nearest neighboring bone.

13. The gangway according to claim 12, further comprising entry openings for entry into the gangway at opposite ends of the gangway, wherein a majority of said plurality of bones are elongated elements that extend in the direction that points from one end of the gangway to the opposite end of the gangway.

14. The gangway according to claim 12, wherein said floor includes first and second treadplates, wherein at least the first treadplate includes a basic body of a first material and a plurality of bones of a second material, the plurality of bones encapsulated by the first material, wherein the second material has a higher elastic modulus than the first material and/or a stiffness of at least one bone of the several bones is higher than the stiffness of the basic body.

15. The gangway according to claim 14, wherein the first treadplate rests on the second treadplate.

16. The gangway according to claim 14, wherein the second treadplate rests on the first treadplate.

17. The gangway according to claim 12, wherein the second material has a higher elastic modulus than the first material.

18. The gangway according to claim 12, wherein the stiffness of at least one bone of the plurality of bones is higher than the stiffness of the basic body.

19. A method for producing a treadplate comprising:
   providing a basic body of a first material;
   providing a plurality of bones of a second material; and
   vulcanizing the basic body onto the plurality of bones;
   wherein the second material has a higher elastic modulus than the first material, and/or a stiffness of at least one bone of the plurality of bones is higher than the stiffness of the basic body;
   wherein a gap exists between each one of the bones and a nearest neighboring bone, and a width of a bone in a width direction is larger than the gap;
   wherein the gap extends along an entire length of each one of the bones and the nearest neighboring bone.

20. The method of claim 19, wherein the second material has a higher elastic modulus than the first material, and wherein the plurality of bones are encapsulated by the first material.

21. The method of claim 19, wherein the stiffness of at least one bone of the plurality of bones is higher than the stiffness of the basic body.

\* \* \* \* \*